US012752870B2

(12) United States Patent
Subramanian

(10) Patent No.: US 12,752,870 B2
(45) Date of Patent: Oct. 6, 2026

(54) HANDLING AN AXLE CONFIGURATION OF A VEHICLE

(71) Applicant: Volvo Truck Corporation, Gothenburg (SE)

(72) Inventor: Chidambaram Subramanian, Jamestown, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 1 day.

(21) Appl. No.: 18/820,405

(22) Filed: Aug. 30, 2024

(65) Prior Publication Data

US 2025/0074522 A1 Mar. 6, 2025

(30) Foreign Application Priority Data

Sep. 1, 2023 (EP) .................................... 23194880

(51) Int. Cl.

*B62D 61/12* (2006.01)
*B60W 30/02* (2012.01)
*B60W 40/13* (2012.01)
*B60W 50/00* (2006.01)

(52) U.S. Cl.

CPC ........... *B62D 61/125* (2013.01); *B60W 30/02* (2013.01); *B60W 40/13* (2013.01); *B60W 50/0097* (2013.01)

(58) Field of Classification Search

CPC .... B60G 2300/402; B60W 2050/0088; B60W 2300/125; B60W 2300/14; B60W 2530/10; B60W 2530/203; B60W 3556/10; B60W 3556/20; B60W 30/02; B60W 40/13; B60W 50/0097; B62D 61/12; B62D 61/125

See application file for complete search history.

(56) References Cited

U.S. PATENT DOCUMENTS

2022/0041172 A1 2/2022 Jundt et al.
2024/0034116 A1* 2/2024 Coombs ............. B60G 17/0165
2024/0343256 A1* 10/2024 Korayem ............... B60K 35/22

FOREIGN PATENT DOCUMENTS

DE 102020123221 A1 3/2022
EP 2949532 A2 12/2015

OTHER PUBLICATIONS

Extended European Search Report, European Application No. 23194880.3, mailed Feb. 27, 2024, 8 pages.

* cited by examiner

*Primary Examiner* — Wade Miles
*Assistant Examiner* — Zachary Joseph Wallace
(74) *Attorney, Agent, or Firm* — Sage Patent Group

(57) ABSTRACT

A computer-implemented method for handling an axle configuration of a vehicle is provided. The axle configuration is indicative of a number of axles of the vehicle. The method includes obtaining vehicle condition data indicative of at least one load applied to the vehicle. The method includes obtaining the axle configuration of the vehicle. The method includes obtaining estimating a current weight of the vehicle based on the obtained vehicle condition data and based on the axle configuration of the vehicle. The method includes obtaining a previously estimated weight of the vehicle. The method includes, based on a difference between the previously estimated weight and the current weight of the vehicle, predicting whether there has been a change in the axle configuration of the vehicle.

14 Claims, 7 Drawing Sheets

HANDLING AN AXLE CONFIGURATION OF A VEHICLE

CROSS REFERENCE TO RELATED APPLICATIONS

This application claims priority to European Patent Application No. 23194880.3, filed on Sep. 1, 2023, the disclosure and content of which is incorporated by reference herein in its entirety.

TECHNICAL FIELD

The disclosure relates generally to handling an axle configuration. In particular aspects, the disclosure relates to predicting whether there has been a change in an axle configuration. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

To modify capabilities and/or operating behavior of a vehicle such as to improve load capacity of the vehicle, a vehicle owner may modify the vehicle by adding and/or removing axles to the vehicle.

However, operational parameters of the vehicle such as brake parameters may be configured for a set number of axles and axle positions of the vehicle. Hence, as the number of axles change, an operational performance of the vehicle may be degraded.

SUMMARY

According to a first aspect of the disclosure, a computer system comprising processing circuitry configured to handle an axle configuration of a vehicle is provided. The axle configuration is at least indicative of a number of axles of the vehicle. The processing circuitry is further configured to obtain vehicle condition data indicative of at least one load applied to the vehicle. The processing circuitry is further configured to obtain the axle configuration of the vehicle. The processing circuitry is further configured to estimate a current weight of the vehicle based on the obtained vehicle condition data and based on the axle configuration of the vehicle. The processing circuitry is further configured to obtain a previously estimated weight of the vehicle. The processing circuitry is further configured to, based on a difference between the previously estimated weight and the current weight of the vehicle, predict whether there has been a change in the axle configuration of the vehicle.

The first aspect of the disclosure may seek to improve operability of the vehicle and/or to improve traffic safety.

A technical benefit may include enabling to adapt configurations, parameters, and/or models relating to operating the vehicle when it is predicted that there has been a change in the axle configuration. Additionally or alternatively, when it is predicted that there has been a change in the axle configuration, the vehicle may be enabled to alert that a change in axle configuration has been made, e.g., to any one or more out of: other traffic participants, to insurance companies, a manufacturer of the vehicle, relevant authorities, the driver, and/or other vehicle systems, etc.

Optionally in some examples, when predicting that there has been a change in the axle configuration of the vehicle, the processing circuitry is further configured to, based on the difference between the previously estimated weight and the current weight of the vehicle, predict an updated axle configuration of the vehicle.

A technical benefit may include enabling to adapt configurations, parameters, and/or models, e.g., brake parameters, of the vehicle based on the updated axle configuration.

Optionally in some examples, the processing circuitry is further configured to detect the fulfillment of a triggering condition. In these examples, the processing circuitry is configured to estimate the current weight of the vehicle and/or to obtain the vehicle condition data in response to the fulfilment of the triggering condition. In some of these examples, the triggering condition comprises any one or more out of:

- the vehicle is detached from a trailer,
- the vehicle has travelled at least a first predefined distance since estimation of the previously estimated weight,
- a time period since estimating the previously estimated weight exceeds a threshold.

A technical benefit may include improved accuracy of predicting whether or not there has been a change in the axle configuration, or improved accuracy of predicting an updated axle configuration.

Optionally in some examples, the processing circuitry is further configured to adapt one or more parameters used for controlling the vehicle based on the updated axle configuration.

A technical benefit may include improved operability and performance of the vehicle.

Optionally in some examples, the updated axle configuration is indicative of any one or more out of:

- a number of axles added to, or removed from, the axle configuration,
- a type of one or more axles added to, or removed from, the axle configuration,
- a position of one or more axles added to, or removed from, the axle configuration, A technical benefit may include improved operability and performance of the vehicle. This is since the vehicle may be configured appropriately based on the increased detail of the axle configuration.

Optionally in some examples, the processing circuitry is further configured to predict the updated axle configuration based on a trained statistical model, or based on a predefined heuristic model.

A technical benefit may include improved accuracy of predicting whether or not there has been a change in the axle configuration, or improved accuracy of predicting an updated axle configuration.

Optionally in some examples, the trained statistical model is trained based on training data of one or more training vehicles travelling with a modified training axle configuration, and wherein the training data comprises any one or more out of:

- an initial axle configuration of the respective one or more training vehicles,
- a modification performed to the modified training axle configuration of the respective one or more training vehicles,
- a weight of the respective one or more training vehicles,
- a position of the one or more training vehicles,
- one or more vehicle motion parameters of the respective one or more training vehicles.

A technical benefit may include improved accuracy of predicting whether or not there has been a change in the axle configuration, and/or improved accuracy of predicting an updated axle configuration. This is since the trained statistical model may use additional parameters for predicting whether or not there has been a change in the axle configuration and/or which change that has occurred.

Optionally in some examples, the processing circuitry is configured to predict that there has been a change in a number of axles in the axle configuration when the current estimated weight differs from the previously estimated weight by more than a threshold.

A technical benefit may include improved accuracy of predicting whether or not there has been a change in the axle configuration, and/or improved accuracy of predicting an updated axle configuration. This is since it may be predetermined how much weight changes when an axle is added or removed.

Optionally in some examples, the processing circuitry is configured to predict that there has been a change in the number of axles in the axle configuration by being configured to predict a quantity of axles that have been added or removed from the axle configuration based on the difference between the previously estimated weight and the current weight of the vehicle.

A technical benefit may include improved accuracy of predicting whether or not there has been a change in the axle configuration, and/or improved accuracy of predicting an updated axle configuration. This is since it may be predetermined how much weight changes when one or two axles are added or removed.

Optionally in some examples, the vehicle condition data is indicative of a current respective load applied to at least one axle with a respective predefined position of the vehicle. In these examples, the processing circuitry is further configured to obtain a respective previously applied load to the at least one axle. Furthermore, in these examples, the processing circuitry is further configured to predict a type and/or position of an added or removed axle based on a difference between the current respective load applied to the at least one axle and the previously applied load to the at least one axle.

A technical benefit may include improved accuracy of predicting an updated axle configuration of the vehicle and/or improved accuracy of predicting an updated axle configuration.

According to a second aspect of the disclosure, a vehicle comprising the computer system of the first aspect is provided.

A technical benefit of the second aspect corresponds to the technical benefit of the first aspect.

Examples of the first aspect apply to the second aspect in a corresponding manner, and vice versa.

In some examples, the vehicle is modified with an added axle.

According to a third aspect, a computer-implemented method for handling an axle configuration of a vehicle is provided. The axle configuration is at least indicative of a number of axles of the vehicle. The method comprises, by a processing circuitry of a computer system, obtaining vehicle condition data indicative of at least one load applied to the vehicle. The method comprises, by the processing circuitry, obtaining the axle configuration of the vehicle. The method comprises, by the processing circuitry, estimating a current weight of the vehicle based on the obtained vehicle condition data and based on the axle configuration of the vehicle. The method comprises, by the processing circuitry, obtaining a previously estimated weight of the vehicle. The method comprises, by the processing circuitry, based on a difference between the previously estimated weight and the current weight of the vehicle, predicting whether there has been a change in the axle configuration of the vehicle.

The third aspect of the disclosure may seek to improve operability of the vehicle and/or to improve traffic safety.

A technical benefit of the third aspect may correspond to the technical benefits of the first and/or second aspects in a corresponding manner. All examples of the first and/or second aspects apply to and may be combined with the examples of the third aspect and vice versa.

In some examples, predicting that there has been a change in the axle configuration of the vehicle, further comprises predicting an updated axle configuration of the vehicle.

In some examples, the method comprises detecting the fulfillment of a triggering condition. In these examples, estimating the current weight of the vehicle and/or to obtaining the vehicle condition data, is performed in response to the fulfilment of the triggering condition. In these examples, the triggering condition comprises any one or more out of:

- the vehicle is detached from a trailer,
- the vehicle has travelled at least a first predefined distance since estimation of the previously estimated weight,
- a time period since estimating the previously estimated weight exceeds a threshold.

In some examples, the method comprises adapting one or more parameters used for controlling the vehicle based on the updated axle configuration.

In some examples, the updated axle configuration is indicative of any one or more out of:

- a number of axles added to, or removed from, the axle configuration,
- a type of one or more axles added to, or removed from, the axle configuration,
- a position of one or more axles added to, or removed from, the axle configuration.

In some examples, predicting the updated axle configuration comprises predicting the updated axle configuration based on a trained statistical model, or based on a predefined heuristic model.

According to a fourth aspect, a computer program product is provided. The computer program product comprises program code for performing, when executed by the processing circuitry, the method of the third aspect.

According to a fifth aspect, a non-transitory computer-readable storage medium is provided. The non-transitory computer-readable storage medium comprises instructions, which when executed by the processing circuitry, cause the processing circuitry to perform the method of the third aspect.

The technical benefits of the fourth and/or the fifth aspect correspond to the technical benefits of the third aspect. Any examples applicable to the third aspect is applicable to the fourth aspect and/or the fifth aspect in a corresponding manner, and vice versa.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
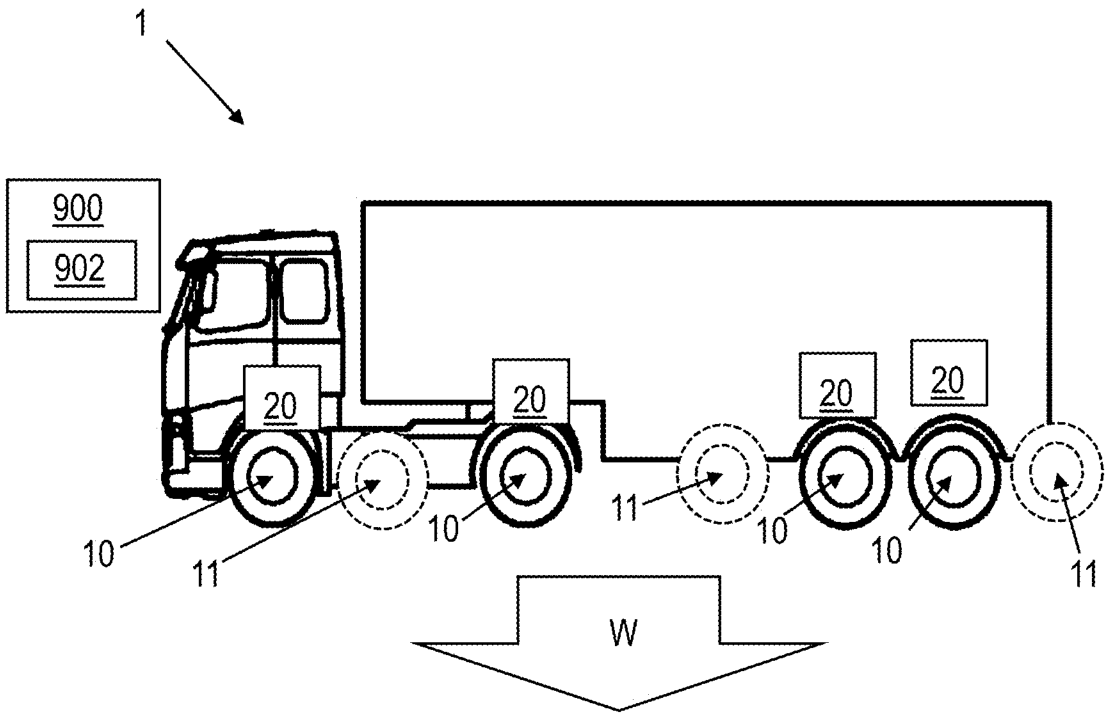
FIG. 1 is an exemplary vehicle according to an example.

FIG. 1 illustrates an exemplary vehicle 1 according to an example. The vehicle may be any suitable vehicle. For example, the vehicle 1 may be any one of a heavy-duty vehicle, such as a truck, semi-truck, tractor, car, bus, or a construction equipment. The vehicle 1 may be any suitable vehicle comprising vehicle axles, e.g., with associated one or more wheels or other ground engaging members. The vehicle 1 may be a vehicle combination which further comprises, and/or is attached to one or more trailers. The vehicle 1 may be able to detach from the one or more trailers.

The vehicle 1 e.g., in an original build such as in an initial state, comprises at least one axle 10. Typically, the at least one axle 10 is represented by, e.g., in an original build, at least two axles. The at least one axle 10 may also be represented by, e.g., in an original build, three axles or four axles.

The at least one axle 10 may be associated with an axle configuration. The axle configuration is at least indicative of how many axles are currently indicated to be part of the vehicle 1.

In examples used herein, the axle configuration may be an initial axle configuration of the vehicle 1, i.e., an unmodified axle configuration, meaning that the vehicle 1 comprises the same axles, in the same positions, e.g., as the vehicle 1 were originally produced.

The axle configuration may be indicative of the number of axles of the at least one axle 10.

The axle configuration may be indicative of a position of the axles of the at least one axle 10.

The axle configuration may be indicative of a type of the axles of the at least one axle 10.

The axle configuration may be indicative of a usage status of the axles of the at least one axle 10, e.g., whether or not the axle is currently in use or if it is lifted to not be used by the vehicle 1.

The vehicle 1 may comprise one or more sensors 20. The one or more sensors 20 may be used for obtaining vehicle condition data indicative of at least one load applied to the vehicle 1, e.g., at least one load applied to the at least one axle 10, which may be at least one torque applied to one or more or all of the axles and/or wheels of the at least one axle 10. Additionally or alternatively, the one or more sensors 20 may be used for obtaining vehicle condition data indicative of a motion of the vehicle, e.g., vehicle speed and/or wheel speeds.

The vehicle 1 may be modified such that an axle out of the at least one axle 10 is removed. The removal of the axle is not directly indicated by the axle configuration, and is instead predicted by some examples herein.

The vehicle 1 may be modified such that an axle out of the at least one axle 10 is added. In FIG. 1, this is illustrated by at least one added axle 11. The at least one added axle 11 may be added in any suitable position of the vehicle, e.g., in the front or in the rear.

The at least one added axle 11 may comprise a front axle and/or a rear axle.

The at least one added axle 11 may comprise an axle added between any one or more or out of the at least one axle 10.

The at least one added axle 11 may for example comprise one added axle or two added axles.

The at least one added axle 11 may comprise more than two added axles.

The at least one added axle 11 may comprise a steerable or non-steerable axle.

The at least one added axle 11 may comprise a liftable or non-liftable axle.

The at least one added axle 11 may comprise a drive axle, e.g., applicable to supply with a torque.

The at least one added axle 11 may comprise a pusher axle. A pusher axle as used herein may mean an axle positioned, or to be positioned, between a rear axle of the at least one axle 10 and a front axle of the at least one axle 10. A pusher axle may be positioned closer to the front axle than to the rear axle.

The at least one added axle 11 may comprise a tag axle. A tag axle as used herein may mean an axle positioned, or to be positioned, behind a rear axle of the at least one axle 10, e.g., behind being reverse of a forward travel direction of the vehicle 1. In other words, a tax axle may be positioned closer to a rear of the vehicle 1, than an original rear axle of the at least one axle 10.

The removal of the axle is not directly indicated by the axle configuration, and is instead predicted by some examples herein.

In some examples herein, a current weight W of the vehicle 1 may be estimated.

The current weight W may be a Combined Gross Vehicle Weight (CGVW) of the vehicle 1 or any other suitable weight metric.

The current weight W may be estimated by use of the one or more sensors to obtain at least one load applied to or by the vehicle 1 to determine the current weight of the vehicle 1, e.g., using any suitable method, wherein some will be described by some examples herein.

The at least one load may be a torque applied to the at least one axle 10, e.g., which may be compared with a vehicle motion to determine the vehicle weight.

The current weight W is estimated with respect to the axle configuration, e.g., with respect to an initial number of axles, and/or a last updated number of axles in the axle configuration.

When an axle is removed or added, the weight/load is distributed to that or other axles leading to a change in current weight.

Hence, examples herein enable to predict whether or not the axle configuration has changed by detecting a change in weight of the vehicle 1.

Embodiments herein may be performed by a computer system 900 and/or by a processing circuitry 902 therein.

The computer system 900 and/or the processing circuitry 902 therein may be a processor and/or an Electronic Control Unit (ECU).

The computer system 900 and/or the processing circuitry 902 therein may be remote units e.g., as part of a cloud service in a server, and/or comprised in the vehicle 1.

The computer system 900 and/or the processing circuitry 902 therein may be communicatively coupled with, and/or able to control, any suitable unit and/or entity of the vehicle 1. For example, the vehicle 1 may comprise a Controller Area Network (CAN), and an associated CAN bus which the computer system 900 and/or the processing circuitry 902 may use in any suitable manner for obtaining any suitable data and/or parameters of examples herein.

Examples and/or embodiments herein relate to estimating a current weight of the vehicle 1. Using the current weight, and a previously estimated weight, examples and/or embodiments herein may comprise predicting whether or not there has been a change in an axle configuration of the vehicle 1, in particular if an axle has been added or removed from the vehicle 1. This is possible since weight estimations may consider a set, e.g., initial, axle configuration when estimating weight, which weight estimation will therefore change if an axle is added or removed. Furthermore, examples and/or embodiments herein may comprise predicting an updated axle configuration. Furthermore, examples and/or embodiments herein may comprise predicting adapting one or more parameters used for controlling the vehicle 1, based on the updated axle configuration.

Below follows examples and/or embodiments that may be combined with the above examples and/or embodiments, in any suitable manner.

Figure 2:
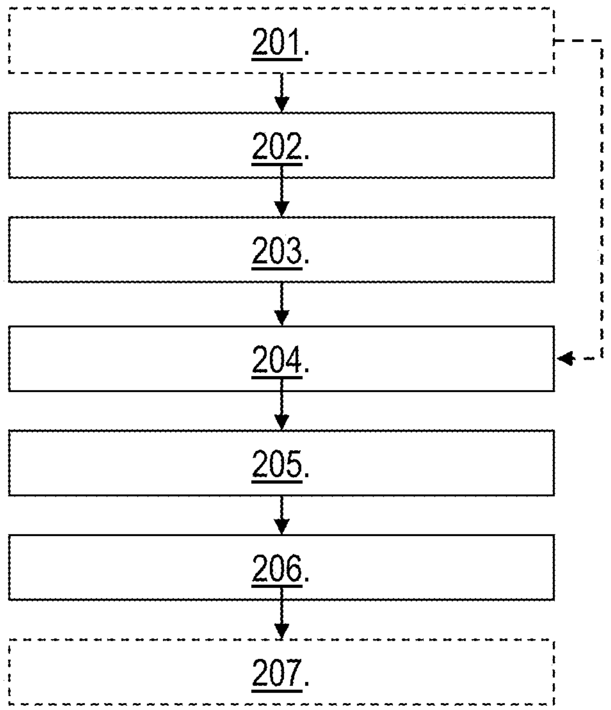
FIG. 2 is an exemplary flow chart of a method according to an example.

FIG. 2 is an exemplary flow chart of a computer-implemented method for handling an axle configuration of the vehicle 1. The axle configuration is at least indicative of a number of axles of the vehicle 1. The method may comprise the following actions, which actions may be taken in any suitable order. Some actions are optional, which are illustrated as dashed boxes in FIG. 2. The method may be performed by the computer system 900 and/or the processing circuitry 902.

Action 201

In some examples, the method comprises detecting a fulfillment of a triggering condition.

The triggering condition may typically comprise that the vehicle 1 is detached from a trailer. This means that the trailer is not affecting a current weight estimation of the vehicle 1 and/or load applied to the vehicle 1.

Additionally or alternatively, the triggering condition comprises that the vehicle 1 has travelled at least a first predefined distance since estimation of a previously estimated weight.

Additionally or alternatively, the triggering condition comprises that a time period since estimating the previously estimated weight exceeds a threshold.

The previously estimated weight may have been estimated in any suitable manner, e.g., as in action 204.

The triggering condition may be arranged to, when detected to be fulfilled, trigger any one or more out of the following actions: 202-207.

Action 202

The method comprises obtaining vehicle condition data indicative of at least one load applied to the vehicle 1.

In examples herein, the at least one load applied to the vehicle 1 may additionally or alternatively be at least one load applied by the vehicle 1.

The at least one load applied to the vehicle 1 may be a torque applied to one or more or all wheels and/or axles of the at least one axle 10.

Additionally or alternatively, the at least one load applied to the vehicle 1 may be a torque applied to a driveline of the vehicle 1.

Additionally or alternatively, the at least one load applied to the vehicle 1 may be a torque applied to by a powertrain or motor/engine of the vehicle 1.

Additionally or alternatively, the at least one load may be associated with any force and/or motion applied to, or by the vehicle 1, which can be used to estimate the current weight of the vehicle 1.

In some examples, obtaining the vehicle condition data is performed in response to the fulfilment of the triggering condition.

In some examples, the vehicle condition data comprises any one or more out of:

- at least one load applied to the vehicle 1,
- at least one load applied to the at least one axle 10,
- at least one torque applied to at least one wheel of the at least one axle 10,
- a vehicle motion,
- a vehicle speed,
- a steering wheel angle of the vehicle 1 and/or a wheel angle of wheels of the vehicle 1, and
- wheel speed of one or more wheels of the at least one axle 10.

Action 203

The method comprises obtaining the axle configuration of the vehicle 1.

The axle configuration may be indicative of the number of axles in an initial axle configuration, i.e., the number of axles of the at least one axle 10.

The axle configuration may further be indicative of where any one or more axles out of the at least one axle 10 are positioned, relative to each other, and/or in absolute positions.

The axle configuration may further be indicative of any suitable parameter, e.g., as discussed with respect to FIG. 1.

Action 204

The method comprises estimating a current weight W of the vehicle 1 based on the obtained vehicle condition data and based on the axle configuration of the vehicle 1.

In some examples, estimating the current weight W of the vehicle 1 is performed in response to the fulfilment of the triggering condition.

Estimating the current weight W may be performed in any suitable manner based on the obtained vehicle condition data and based on the axle configuration of the vehicle 1.

Many different methods may be used for estimating the weight of a vehicle. In particular examples herein, the current weight W of the vehicle 1 may be estimated based on a torque applied to the at least one axle 10, and based on an obtained vehicle motion, e.g., as part of the vehicle condition data, e.g., any one or more out of a vehicle motion, vehicle speed, wheel speeds, steering wheel angle. The vehicle motion obtained by the applied torque has a direct correlation to the weight of the vehicle. This is since a given torque will propel the vehicle 1 of a certain weight in a certain vehicle motion, e.g., speed, due to laws of mechanics, and when the vehicle motion, e.g., vehicle or wheel speed, and the torque applied is known, the weight can be determined.

In other words, since Torque applied to the at least one axle 10, and the resultant vehicle motion, e.g., as in the vehicle condition data, is dependent on the mass of the vehicle 1, the weight w can be determined, e.g., based on heuristics or any predefined model.

The applied torque and vehicle motion may be obtained by any suitable sensors and/or estimations, e.g., as in the vehicle condition data, and therefore, the unknown mass, i.e., the weight W, will be identified.

Further vehicle parameters may be used to estimate the weight w of the vehicle with improved accuracy, e.g., friction of a travelled road of the vehicle 1, tire models, etc.

Estimating the current weight W of the vehicle 1 may in some examples further comprise estimating a weight associated with all axles controllable by the vehicle, e.g., the at least one axle 10. The weight of each respective axle may be estimated based on a respective applied torque to the respective axle and based on a respective wheel speed of at least one wheel of the respective axle.

Action 205

The method comprises obtaining a previously estimated weight of the vehicle 1.

The previously estimated weight of the vehicle 1 may have been estimated, e.g., as in action 204 and stored in a temporary storage, e.g., in a memory and/or database and/or data storage and/or storage medium of the computer system 900, e.g., a storage device 914. The previously estimated weight may be obtained from said temporary storage.

The previously estimated weight of the vehicle 1 may have been obtained during a previous key cycle event, e.g., when the vehicle 1 is turned on.

The current estimated weight of the vehicle 1 may subsequently replace the previously estimated weight for future predictions.

Action 206

The method comprises predicting whether there has been a change in the axle configuration of the vehicle 1.

In some examples, predicting whether there has been a change in the axle configuration of the vehicle 1 comprises determining whether there has been a change in the axle configuration of the vehicle 1.

In some examples, predicting whether there has been a change in the axle configuration of the vehicle 1 comprises predicting or determining that there has been a change in the axle configuration of the vehicle 1.

In some examples, predicting whether there has been a change in the axle configuration of the vehicle 1 is based on a difference between the previously estimated weight and the current weight W of the vehicle 1.

In other words, when the difference between the previously estimated weight and the current weight W of the vehicle 1 is too great, it may be predicted that an axle is added or removed.

When the current estimated weight W is greater than the previously estimated weight, it may be predicted that an axle has been added from the vehicle 1.

When the current estimated weight W is less than the previously estimated weight, it may be predicted that an axle has been removed from the vehicle 1.

In some examples, predicting that there has been a change in the axle configuration of the vehicle 1, further comprises predicting an updated axle configuration of the vehicle 1.

In some examples, predicting the updated axle configuration may comprise predicting how many axles have been added or removed to the axle configuration.

In some examples, predicting the updated axle configuration may comprise predicting a position of an added axle.

In some examples, predicting the updated axle configuration may comprise determining the updated axle configuration.

In some examples, predicting the updated axle configuration may be based on a current estimated axle load of one or more axle load of the at least one axle 10 compared with a previously estimated axle load of the respective axles. Based on how the axle loads change, a position of axle may be determined, e.g., relative to other axles of the at least one axle 10. When an axle is added, due to predefined distance parameters of distances between axles and/or regional requirements and/or physical limitations, it may further be possible to estimate an absolute position of the at least one added axle 11, e.g., as part of predicting the updated axle configuration.

In some examples, the updated axle configuration is indicative of any one or more out of:

- a number of axles added to, or removed from, the axle configuration,
- a type of one or more axles added to, or removed from, the axle configuration,
- a position of one or more axles added to, or removed from, the axle configuration.

In some examples, predicting whether there has been a change in the axle configuration of the vehicle 1 comprises predicting that there has been a change in a number of axles in the axle configuration when the current estimated weight differs from the previously estimated weight by more than a threshold, e.g., 800 kilograms.

In some examples, predicting whether there has been a change in the axle configuration of the vehicle 1 comprises predicting that there has been a change in the number of axles in the axle configuration by predicting that a quantity of axles that have been added or removed from the axle configuration based on the difference between the previously estimated weight and the current weight W of the vehicle 1. In other words, if the weight between the current weight and the previously estimated weight differs by more than a second threshold, e.g., 1600 kilograms, then two axles may be removed or added from the vehicle 1.

In some examples, the updated axle configuration is predicted based on a trained statistical model, or based on a predefined heuristic model.

In some examples, the trained statistical model is trained based on training data of one or more training vehicles travelling with a modified training axle configuration. The one or more training vehicles may or may not comprise the vehicle 1. The one or more training vehicles may or may not comprise simulated vehicles. The one or more training vehicles may comprise at least one vehicle with a same initial axle configuration, i.e., number and position of axles built from production, as an initial axle configuration of the vehicle 1.

In some examples, the training data comprises any one or more out of:

- an initial axle configuration of the respective one or more training vehicles, e.g., the number of axles and/or the position of the axles, a modification performed to the modified training axle configuration of the respective one or more training vehicles, an initial and/or estimated weight of the respective one or more training vehicles, a position of the one or more training vehicles, e.g., a Global Positioning System (GPS) or Global navigation satellite system (GNSS) position, one or more vehicle motion parameters of the respective one or more training vehicles.

Since different jurisdictions have different legal requirements and/or need of which modifications to perform to the axle configuration, the position of the one or more training vehicles as part of the training data have been indicated to be a distinguishing factor in training the trained statistical model with a high increase in accuracy when used.

Predicting the updated axle configuration may therefore comprise inputting one or more input parameters as inference to the trained statistical mode. The one or more input parameters may correspond to the training data.

The one or more input parameters may for example comprise any one or more out of:

an initial and/or current axle configuration of the vehicle 1, an initial and/or estimated weight of the vehicle 1, a position, e.g., GPS or GNSS position, of the vehicle 1, and one or more vehicle motion parameters of the vehicle 1.

In some examples, the one or more input parameters may at least partly be obtained from the set of sensors 20, or derived from sensor data thereof.

Predicting whether there has been a change in the axle configuration of the vehicle 1 and/or predicting the updated axle configuration may comprise estimating a confidence value of the prediction(s).

Action 207

In some examples, the method comprises adapting one or more parameters used for controlling the vehicle 1 based on the updated axle configuration. The one or more parameter may be parameters for controlling a motion of the vehicle 1 and/or related to dynamic of the vehicle 1. The one or more parameters may be one or more brake parameters.

Additionally or alternatively, the one or more parameters may relate to any one or more out of:

One or more advance driver assistance parameters for the vehicle 1, one or more suspension parameters, e.g., for electronically controlled suspension of the vehicle 1, one or more brake system parameters of the vehicle 1, one or more steering parameters, e.g., for a steering system such as for defining a turning radius of the vehicle 1.

In some examples, adapting the one or more parameters is based on the confidence value of the prediction(s) of action 206.

In some examples, adapting the one or more parameters is performed in response to detecting that the confidence value of the prediction(s) of action 206 is above a threshold.

AI Based Model and Physics Based Model

Examples herein, e.g., Actions 201-207 above, may be performed by a physics based model, e.g., based on the predefined heuristic model and/or based on an Artificial Intelligence (AI) model using the trained statistical model, which will be further exemplified below.

AI Model

The AI model may comprise any example and/or embodiment using the trained statistical model, e.g., for predicting whether or not there has been a change in the axle configurations and/or in predicting the updated axle configuration. The AI model may be performed as part of the method actions 201-207 above.

The trained statistical model may be used to predict whether there has been a change in the axle configuration of the vehicle 1, e.g., if an axle has been added or removed, and if so, optionally their relative and/or absolute position.

The trained statistical model may be used in conjunction with the physics based model, e.g., for predicting any suitable parameter of the physics based model.

In some examples, the AI model utilizes training and/or input data of vehicles, e.g., the vehicle 1, and/or from training vehicles to train the trained statistical model on parameters for different axle configurations.

The trained statistical model may comprise a neural network model. The neural network model may be produced using any suitable programming language or environment. The neural network model may comprise a neural network trained with the training data discussed above with respect to action 206.

In some examples, it has been particularly noted that, surprisingly, using the training data, a cluster of data and trend such as if the truck is in a particular region, the retrofits, i.e., initial axle configurations are usually a 6×4 truck to a 10×4 truck, with 2 additional added pusher axles. This type of data driven confidence cannot be obtained via physics based models. Hence, the trained statistical model may be used in addition to any other example herein to improve prediction accuracy.

The training of the trained statistical model may be an on-going process where the training links physics signals to known retrofits, e.g., based on dealer information to assist trucks which are not retrofitted by a dealer.

The trained statistical model may comprise any one or more out of: fine tree, gaussian Vector, ensemble bagged trees, support vector machines, deep neural network using a Levenberg-Marquardt method and/or Bayesian regularization and/or scaled conjugate method with different number of hidden layers and neurons. The number of hidden layers and neurons may be decided and/or configured based on training and testing performance of the trained statistical model.

For example, additional hidden layers may need to be added if the accuracy is below a threshold.

Physics Based Model

The physics based model may use heuristics, e.g., predefined heuristic model, for estimating the weight of the vehicle, and then to predict whether or not there has been a change in the number of axles of the vehicle 1, e.g., as in actions 201-207.

The physics based model may comprise concepts of having multiple flags and/or parameters work in parallel to predict the axle configuration and/or change thereof.

The flow diagrams of FIGS. 3-6 may illustrate a method performing the physics based model. The flow diagrams of FIGS. 3-6 may, however, also in some examples be part of the AI based model.

The actions of the flow chart exemplified in FIGS. 3-6 are respectively applicable to be combined with any one or more out of the actions in the flow chart of FIG. 2, and vice versa. The respective methods of FIGS. 3-6 may be performed by the computer system 900 and/or the processing circuitry 902, e.g., as part of the method of any one or more out of actions 201-207 above.

Figure 3A:
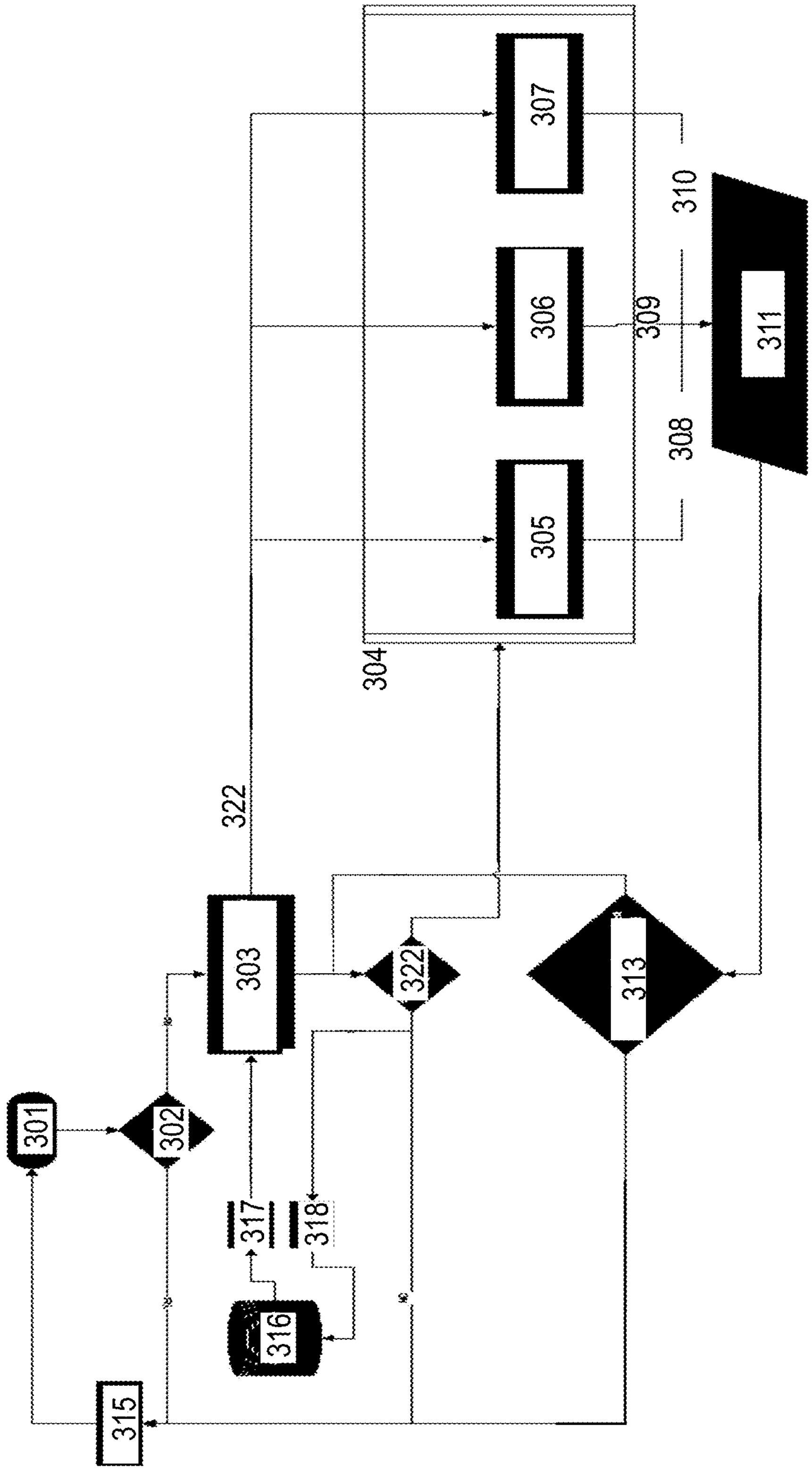
FIG. 3A is an exemplary flow chart of a method according to an example.

FIG. 3A is an exemplary flow chart of a method according to an example. The method of FIG. 3A may relate to detect a triggered weight flag 311, e.g., a GCVW flag. The prediction(s) of action 206 may be based on the triggered weight flag 311.

The weight flag 311 may be triggered when a previously estimated weight is different from a current estimated weight by more than a threshold.

The weight flag 311 may indicate that there has been a change in the axle configuration.

The monitoring starts at a start time 301, usually at a key cycle event. A key cycle event, or also referred to as a key cycle is when a key is used to turn on the vehicle 1. A key cycle event may also be referred to as an ignition cycle event.

If a trailer is connected to the vehicle 1 then we wait until a next initiation of this function, e.g., next key cycle and/or periodic monitor, or event such as, a trailer is removed/detached, e.g., as part of the trigger condition in action 201.

If the trailer is not connected, then a current weight is obtained, e.g., as in action 204, a previously estimated weight is obtained 317 from a memory 316, e.g., as in action 205.

A weight difference 322 between key cycles, is obtained by comparing 303 the previously estimated weight and the current estimated weight. The current key cycle may be stored 318 as well to the memory 316, in particular if a difference 322 indicates that the weight difference 322 is higher than a first threshold, e.g., a 5% increase in weight over the stored previously estimated weight.

If the difference 322 exceeds the first threshold, e.g., X % as configurable value, a change in axle configuration is likely, e.g., as part of predictions in action 206, and the methods herein may comprise assigning a confidence factor based on difference percentages as follows.

If the difference 322 exceeds the first threshold, then a confidence function 304 may be used for determining a confidence of weight difference between the current and previously estimated weight. If the difference is between a first interval, e.g., 5-10%, a first confidence function 305 may transmit 308 a first confidence, e.g., 50%. If the difference is between a second interval, e.g., 10-20%, a second confidence function 306 may transmit 309 a second confidence, e.g., 75%. If the difference is above a third threshold, e.g., 20%, a third confidence function 307 may transmit 309 a third confidence, e.g., 95%.

In other words, with increased weight difference, the prediction accuracy and confidence is increased.

The prediction of actions 206 may further be able to indicate said confidence.

Based on any of the transmissions 308, 309, 310, the weight flag 311 may be triggered. The weight flag 311 may indicate a confidence factor based on the first, second or third confidence.

Using the confidence factor, in some examples, methods herein may accumulate mileage 313 to confidently predict whether there has been a change to the axle configuration. If the confidence factor stays above a threshold for a set mileage, e.g., while repeating 315 the procedure of FIG. 3, it may be predicted that the axle configuration has changed, e.g., that an axle has been added or removed, e.g., as in action 206.

Figure 3B:
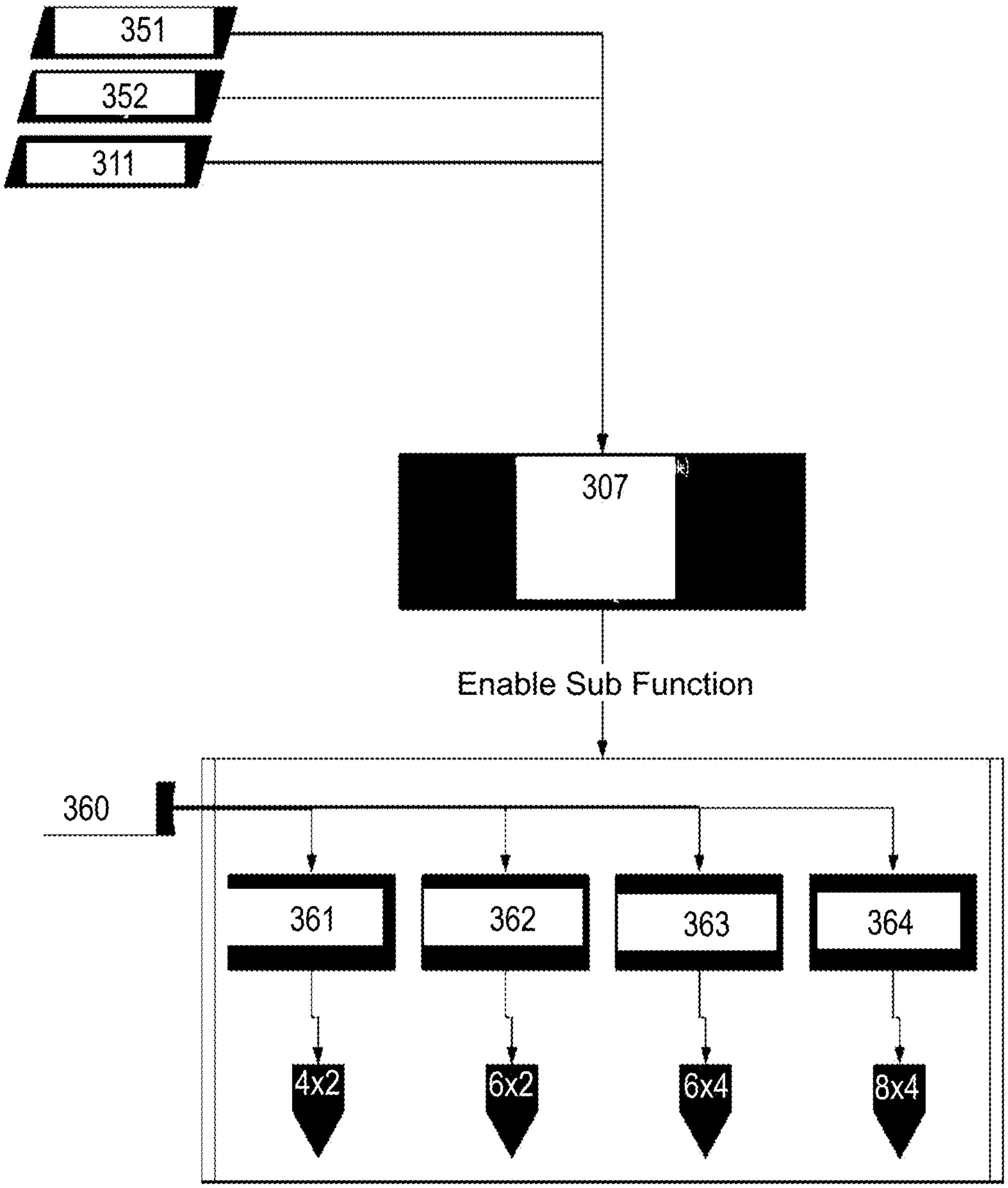
FIG. 3B is an exemplary flow chart of a method according to an example.

FIG. 3B is an exemplary flow chart of a method according to an example.

The method of FIG. 3B may be an extension of the method of FIG. 3A, and may relate to examples when an axle is added or removed to the vehicle 1, e.g., as indicated by the weight flag 311. In these examples, other existing axles, e.g., the at least one axle 10 may experience that a load in bob-tail, e.g., the rear of the vehicle 1, would be decreased or increased respectively.

For individual axles out of the at least one axle 10, a current respective load may be estimated. The current respective load may be a weight of the respective axle, or a weight applied to the respective axle. Based on the respective loads, for each respective axle, the loads may be compared with respective previously estimated loads. For each axle in the vehicle 1, based on the difference between the respective previously estimated load and the respective current estimated load, a confidence of that the axle configuration has been changed may be determined. When the difference is high e.g., above a respective axle load threshold, a high confidence is determined, e.g., 75%.

For any one or more out of the axles, the current respective load may be estimated based on a torque applied to the respective axle, and based on a current measured wheel speed of a wheel of the respective axle.

In examples herein a steering axle confidence 351 that the axle configuration has changed, a drive axle confidence 352 that the axle configuration has changed, and the confidence associated with the weighted flag 311 of FIG. 3A, may enable to predict whether the axle configurations has changed and/or predict the updated axle configuration, as in action 206, only when the weighted average of confidences 351, 352, and the confidence associated with the weighted flag 311, is above a threshold. In some examples, an axle configuration 360 is obtained as a current or initial axle configuration out of axle configurations 361, 362, 363, 364 of the vehicle 1. The axle configuration 360 may be e.g., preconfigured or previously stored with the axle configurations 361, 362, 363, 364, e.g., 4×2, 6×2, 6×4, 8×4, indicating number of wheels and number of driven wheels in an axle configuration, and assuming that each axle has two wheels each.

Figure 4:
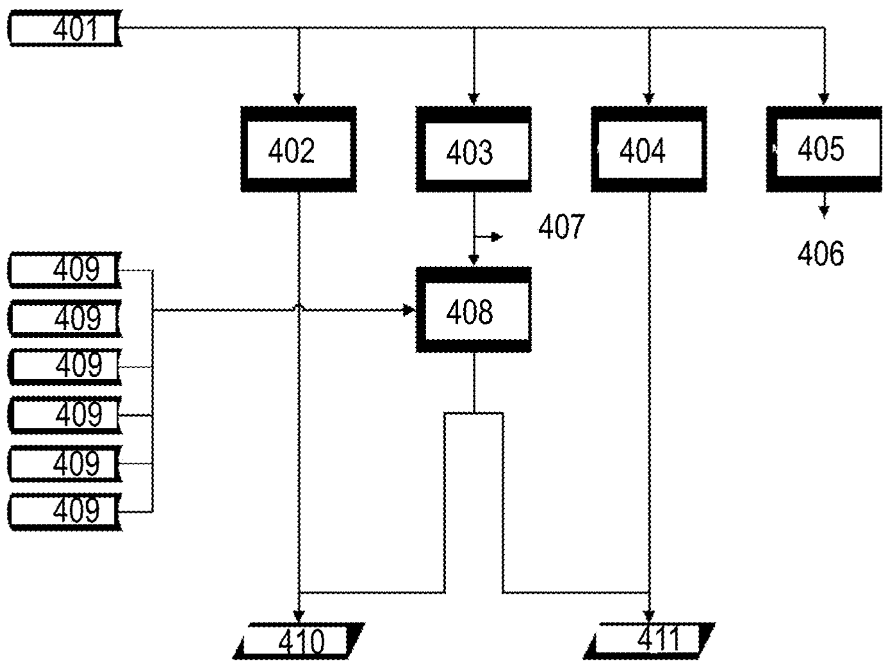
FIG. 4 is an exemplary flow chart of a method according to an example.
Figure 5:
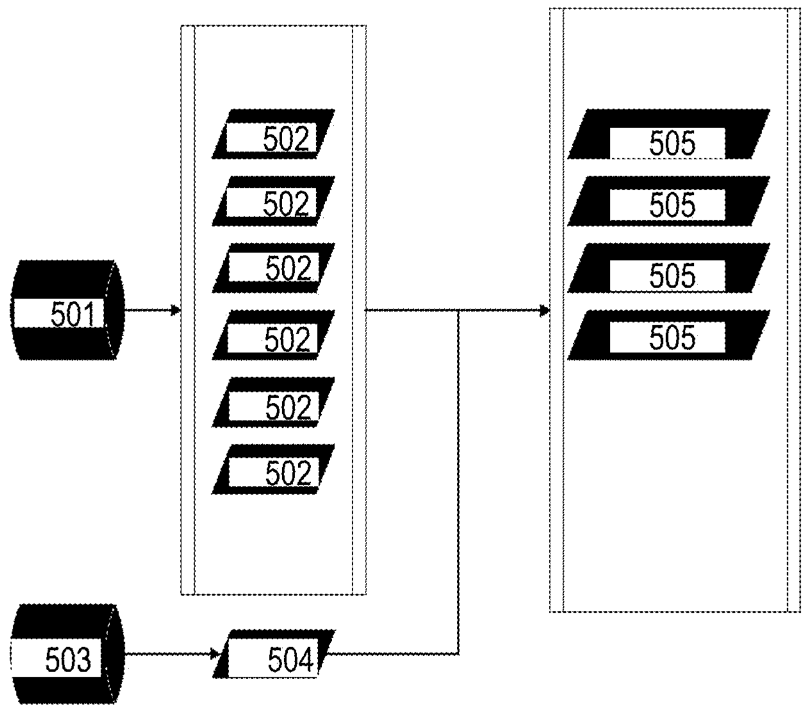
FIG. 5 is an exemplary flow chart of a method according to an example.
Figure 6:
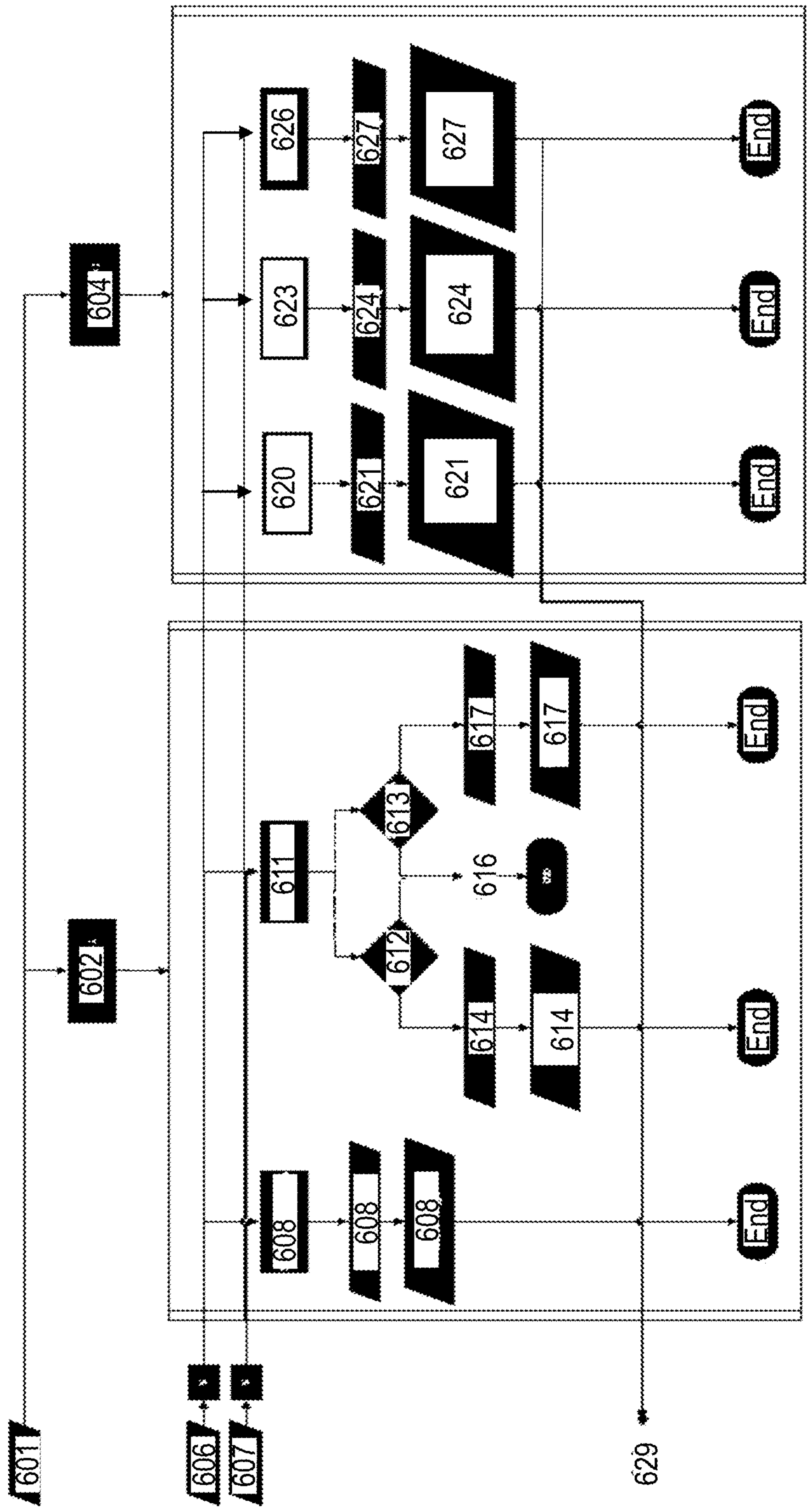
FIG. 6 is an exemplary flow chart of a method according to an example.

The axle configuration 360 has been modified, e.g., an axle has been added, and FIGS. 4-6 further explains how to establish a quantity, type, and/or position of the added axles.

FIG. 4 is an exemplary flow chart of a method according to an example.

Based on a weight difference 401 of the vehicle 1, e.g., the difference between the current weight estimated in action 204 and the previously estimated weight as obtained in action 205, it may be predicted e.g., as part of action 206, how many axles have been added to the axle configuration, e.g., 1 or 2.

When estimating 402 that the weight difference below a first threshold, e.g., less than 800 kilograms, it may be predicted that one axle has been added or removed from the axle configuration.

When estimating 403 that the weight difference is above the first threshold and below a second threshold, e.g., between 800 kilograms to 1600 kilograms, it may be predicted 410, 411 that one or two axles have been added or removed from the axle configuration and/or a customizable function 408 may be triggered. The customizable function 408 may be an alert or a fault report due to that it may not be possible to accurately predict the number of axles. The prediction may be based on obtained vehicle condition data 409, e.g., as obtained in action 202, and/or based on a preconfigured behavior. The vehicle condition data 409 may in these examples be indicative of any one or more out of: a change in load of a drive axle of the vehicle 1, a wheelbase of the vehicle, a body type of the vehicle 1, a position of the vehicle 1, a current weight of the vehicle 1, the axle configuration.

When estimating 404 that the weight difference is above the second threshold and below a third threshold, e.g., more than 1600 kilograms, it may be predicted 411 that two axles have been added or removed from the axle configuration.

When estimating 405 that the weight difference is above the third threshold e.g., 2500 kilograms, an alert, e.g., a fault report, may be triggered 406 as it may not be possible to estimate more than two axles added/removed at a time.

FIG. 5 is an exemplary flow chart of a method according to an example. Further examples, e.g., as part of the method of actions 201-207 may predict a position of added axles. Before enabling such a functionality, parameters of the updated axle configuration may need to be constrained to improve accuracy of predictions, e.g., as in action 206. From a data storage 501, one or more vehicle parameters 502 are obtained. The one or more vehicle parameters may comprise any one or more out of: a Front Axle Position (FAP) of a front axle e.g., of the at least one axle 10, a Rear Axle Position (RAP) e.g., of the at least one axle 10, a Front Brake Chamber Size (FBCS), a Rear Brake Chamber Size (RBCS), a vehicle type, and a body type.

The brake chambers may be defined for load capacity which means that a higher the chamber size indicates, e.g., to the trained statistical model, that an axle is added or will be added.

Based on a position 503 of the vehicle 1, regional requirements 504 for the vehicle 1 and/or the axle configuration may be obtained.

Based on the regional requirements 504 and/or the one or more vehicle parameters 502, constraints 505 may be obtained. The constraints 505 may be indicative of any one or more out of:

- a maximum and/or minimum percentage of a type of axle, e.g., rear pusher and/or front pusher axles,
- a maximum number of axles,
- a maximum number of tag axles, and
- a smallest distance between axles.

Action 206 may comprise predicting the updated axle configuration based on the constraints 505.

FIG. 6 is an exemplary flow chart of a method according to an example.

Based on the obtained data of FIG. 4, it may be possible to determine a position and/or type of added axles to the axle configuration of the vehicle 1.

Based on a change in loads of each axle out of the at least one axle 10, here denoted as change in steering axle load 606, and change in drive axle load 607, it is possible to determine a type and/or position of the at least one added axle 11, e.g., as part of the prediction of the updated axle configuration in action 206. The axle load changes 606, 607, may be changed with respect to a respective current axle load compared with a respective previously estimated axle load. While only two axles are considered in the Example of FIG. 6, a similar approach applies to any number of axles in an initial axle configuration, as the load on each axle may indicate an estimate of between which axles a newly added axle is positioned.

The steering axle may in these examples be a front axle, and the drive axle may be a rear axle.

If the at least one axle 10 has more than two initial/current axles, changes in these axle loads may further be used to determine type and/or position of added axles, i.e., the at least one added axle 11.

When a number of added axles of the at least one added axle 11, represented by a quantity input parameter 601, is one, a first function 602 is used for determining the type and/or position of the at least one added axle 11. When the number of added axles of the at least one added axle 11 is two, a second function 604 is used for determining the type and/or position of the at least one added axle 11.

In some examples, when using the first function 602, and when determining 608 that the change in steering axle load 606 is greater than the change in drive axle load 606, predicting the updated axle configuration may comprise determining that the at least one added axle 11 is a front pusher axle, and has an estimated position based on a position of the steering axle and the drive axle. The estimated position may be determined as a set distance in front of the steering axle in a forward direction of the vehicle 1, based on a distance between the steering axle and the drive axle.

In some examples, when using the first function 602, and when determining 611 that the change in steering axle load 606 is less than (or equal) to the change in drive axle load 606, and when determining 612 that the change in steering axle load 606 is less than a threshold and that the position of the drive axle is within a set first interval of the vehicle 1, determining 614, that the at least one added axle 11 is a tag axle and has an estimated position based on a position of the steering axle and the drive axle. The estimated position may be determined as a set distance behind drive axle in a reverse direction of the vehicle 1, based on a distance between the steering axle and the drive axle.

In some examples, when using the first function 602, and when determining 611 that the change in steering axle load 606 is less than (or equal to) the change in drive axle load 606, and when determining 613 that the change in drive axle load 607 is less than a threshold and that the position of the drive axle is within a set second interval of the vehicle 1, determining 617, that the at least one added axle 11 is a pusher axle and has an estimated position based on a position of the steering axle and the drive axle, i.e. between the drive axle and steering axle. The estimated position may be determined as a predetermined position between the axles.

When not being able to determine the type and/or position of the at least one axle 11, triggering 616 an alert and/or fault report. The alert and/or fault report may indicate to a driver that an axle configuration may have been changed, i.e., an axle has been added, but it is not possible to determine type and/or position of the axle.

In some examples, when using the second function 604, and when determining 620 that the change in steering axle load 606 is above a steering load threshold, and the change in drive axle load 606 is above a drive load threshold, and that the position of the drive axle is within a set third interval of the vehicle 1, determining 621, that the at least one added axle 11 comprises two pusher axles with estimated positions based on a position of the steering axle and the drive axle. The estimated positions may be respectively determined as respective set distances in front of the steering axle in a forward direction of the vehicle 1, based on a distance between the steering axle and the drive axle.

In some examples, when using the second function 604, and when determining 623 that a difference between the change in steering axle load 606 and the change in drive axle load 606 is within a set interval, determining 624, that the at least one added axle 11 comprises one pusher axle and one tag axle with estimated positions based on a position of the steering axle and the drive axle. The pusher axle may be determined with a predetermined position between the steering axle and the drive axle and the tag axle may be determined as a set distance behind drive axle in a reverse direction of the vehicle 1, based on a distance between the steering axle and the drive axle.

In some examples, when using the second function 604, and when determining 626 that a difference between the change in steering axle load 606 and the change in drive axle load 606 is above respective thresholds and that the position of the drive axle is within a set fourth interval of the vehicle 1, determining 627, that the at least one added axle 11 comprises two tag axles with estimated positions based on a position of the steering axle and the drive axle. The tag axles may be determined respectively with respective set distances behind the drive axle in a reverse direction of the vehicle 1, based on a distance between the steering axle and the drive axle.

The predicted updated axle configuration, e.g., as in action 206, may be stored on a block chain on updating the entire configuration, e.g., as in action 207, e.g., from 4×2 to 8×2 if two axles were added, and stored until a next axle configuration change for the vehicle 1. The updated axle configuration may replace an initial axle configuration for any further measurements according to embodiments herein.

Figure 7:
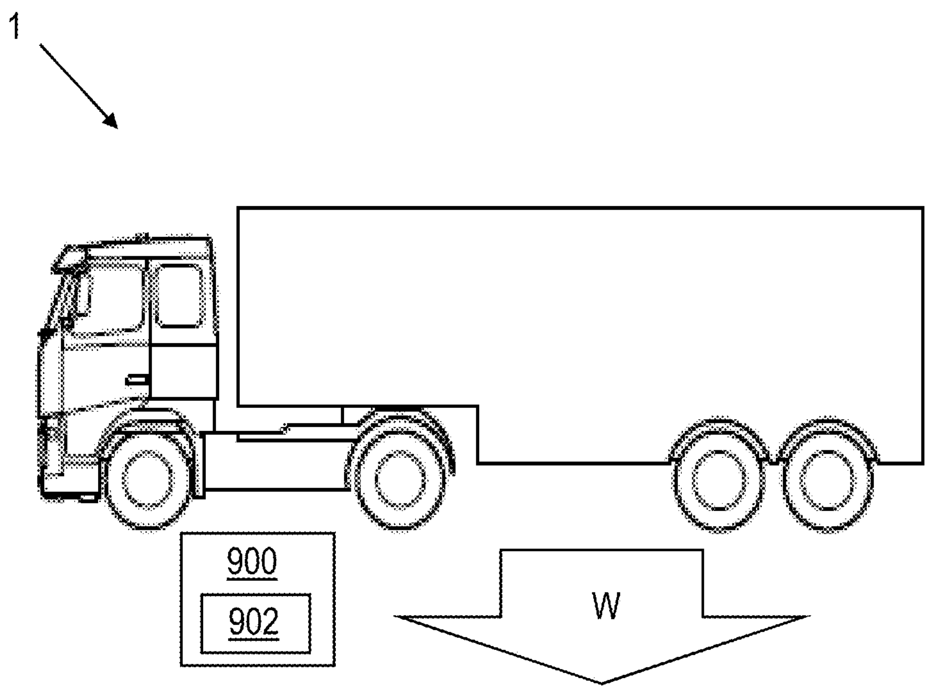
FIG. 7 is another view of FIG. 1, according to an example.

FIG. 7 is another view of FIG. 1, according to an example. The computer system 900 comprises processing circuitry 902 which is configured to handle an axle configuration of the vehicle 1. The axle configuration is at least indicative of a number of axles of the vehicle 1.

The processing circuitry 902 is configured to obtain vehicle condition data indicative of at least one load applied to the vehicle 1. The processing circuitry 902 is configured to obtain the axle configuration of the vehicle 1. The processing circuitry 902 is configured to estimate a current weight W of the vehicle 1 based on the obtained vehicle condition data and based on the axle configuration of the vehicle 1. The processing circuitry 902 is configured to obtain a previously estimated weight of the vehicle 1. The processing circuitry 902 is configured to, based on a difference between the previously estimated weight and the current weight W of the vehicle 1, predict whether there has been a change in the axle configuration of the vehicle 1.

Figure 8:
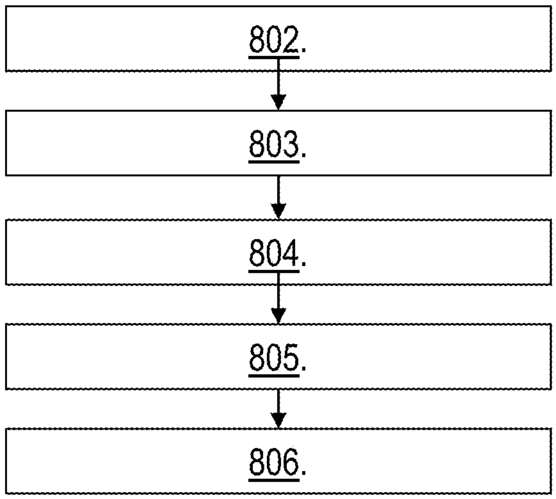
FIG. 8 is a flow chart of an exemplary method according to an example.

FIG. 8 is a flow chart of a computer-implemented method for handling an axle configuration of the vehicle 1. The axle configuration is at least indicative of a number of axles of the vehicle 1. The method comprises actions 802-806 below. Actions 802-806 corresponds to actions 202-206 above. Actions 802-806 are combinable with actions 201-207 above, in any suitable manner.

Action 802. The method comprises: by the processing circuitry 902 of the computer system 900, obtaining vehicle condition data indicative of at least one load applied to the vehicle 1.

Action 803. The method comprises: by the processing circuitry 902, obtaining the axle configuration of the vehicle 1.

Action 804. The method comprises: by the processing circuitry 902, estimating a current weight W of the vehicle 1 based on the obtained vehicle condition data and based on the axle configuration of the vehicle 1.

Action 805. By the processing circuitry 902, obtaining a previously estimated weight of the vehicle 1.

Action 806. By the processing circuitry 902, based on a difference between the previously estimated weight and the current weight W of the vehicle 1, predicting whether there has been a change in the axle configuration of the vehicle 1.

Figure 9:
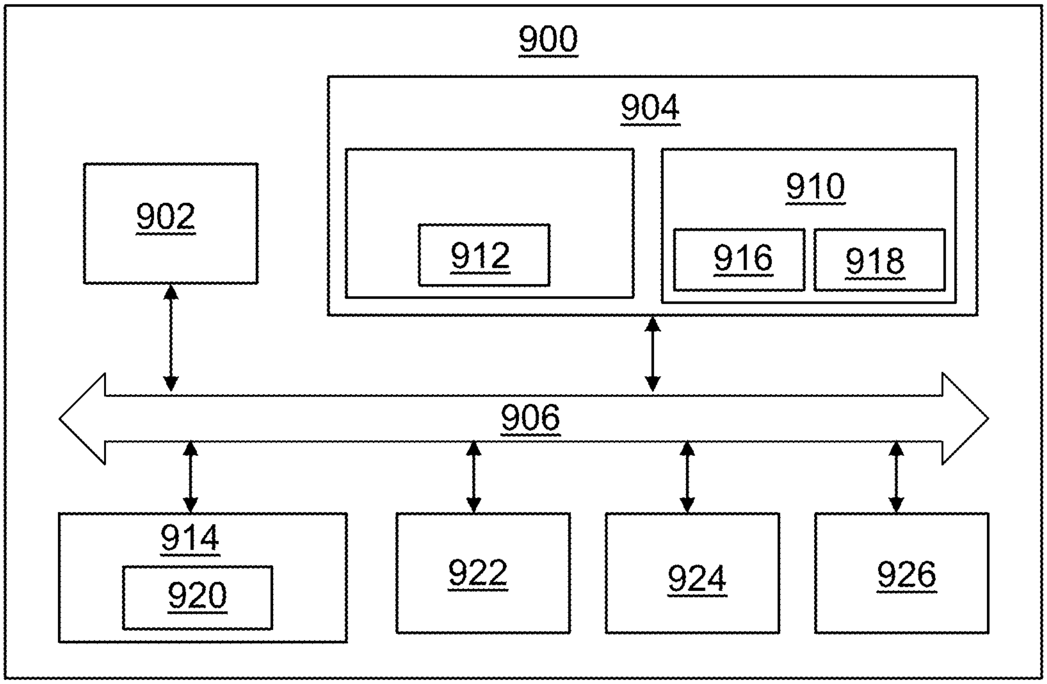
FIG. 9 is a schematic diagram of an exemplary computer system for implementing examples disclosed herein, according to an example.

FIG. 9 is a schematic diagram of the computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN, an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include the processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows a brief summary of examples herein. Any one or more out of below Examples may be combined with any one or more out of the above examples or embodiments in any suitable manner.

Example 1. A computer system 900 comprising processing circuitry 902 configured to handle an axle configuration of a vehicle 1, the axle configuration being at least indicative of a number of axles of the vehicle 1, the processing circuitry 902 further being configured to:

obtain vehicle condition data indicative of at least one load applied to the vehicle 1, obtain the axle configuration of the vehicle 1, estimate a current weight W of the vehicle 1 based on the obtained vehicle condition data and based on the axle configuration of the vehicle 1, obtain a previously estimated weight of the vehicle 1, based on a difference between the previously estimated weight and the current weight W of the vehicle 1, predict whether there has been a change in the axle configuration of the vehicle 1.

Example 2. The computer system 900 of Example 1, wherein when predicting that there has been a change in the axle configuration of the vehicle 1, the processing circuitry 902 is further configured to, based on the difference between the previously estimated weight and the current weight W of the vehicle 1, predict an updated axle configuration of the vehicle 1.

Example 3. The computer system 900 of any of Examples 1-2, wherein the processing circuitry 902 is further configured to detect the fulfillment of a triggering condition, and wherein the processing circuitry 902 is configured to estimate the current weight W of the vehicle 1 and/or to obtain the vehicle condition data in response to the fulfilment of the triggering condition, wherein the triggering condition comprises any one or more out of:

the vehicle 1 is detached from a trailer, the vehicle 1 has travelled at least a first predefined distance since estimation of the previously estimated weight, a time period since estimating the previously estimated weight exceeds a threshold.

Example 4. The computer system 900 of any of Examples 2-3, wherein the processing circuitry 902 is further configured to adapt one or more parameters used for controlling the vehicle 1 based on the updated axle configuration.

Example 5. The computer system 900 of any of Examples 2-4, wherein the updated axle configuration is indicative of any one or more out of:

a number of axles added to, or removed from, the axle configuration, a type of one or more axles added to, or removed from, the axle configuration, a position of one or more axles added to, or removed from, the axle configuration.

Example 6. The computer system 900 of any of Examples 2-5, wherein the processing circuitry 902 is further configured to predict the updated axle configuration based on a trained statistical model, or based on a predefined heuristic model.

Example 7. The computer system 900 of Example 6, wherein the trained statistical model is trained based on training data of one or more training vehicles travelling with a modified training axle configuration, and wherein the training data comprises any one or more out of:

- an initial axle configuration of the respective one or more training vehicles,
- a modification performed to the modified training axle configuration of the respective one or more training vehicles,
- a weight of the respective one or more training vehicles,
- a position of the one or more training vehicles,
- one or more vehicle motion parameters of the respective one or more training vehicles.

Example 8. The computer system 900 of any of Examples 1-7, wherein the processing circuitry 902 is configured to predict that there has been a change in a number of axles in the axle configuration when the current estimated weight differs from the previously estimated weight by more than a threshold.

Example 9 The computer system 900 of Example 8, wherein the processing circuitry 902 is configured to predict that there has been a change in the number of axles in the axle configuration by being configured to predict a quantity of axles that have been added or removed from the axle configuration based on the difference between the previously estimated weight and the current weight W of the vehicle 1.

Example 10. The computer system 900 of Example 9, wherein the vehicle condition data is indicative of a current respective load applied to at least one axle 10 with a respective predefined position of the vehicle 1, and wherein the processing circuitry 902 is further configured to obtain a respective previously applied load to the at least one axle 10, and wherein the processing circuitry 902 is further configured to predict a type and/or position of an added or removed axle based on a difference between the current respective load applied to the at least one axle 10 and the previously applied load to the at least one axle 10.

Example 11. A vehicle 1 comprising the computer system 900 of any of Examples 1-10.

Example 12. The vehicle 1 according to Example 11, wherein the vehicle 1 is modified with an added axle 11.

Example 13. A computer-implemented method for handling an axle configuration of a vehicle 1, the axle configuration being at least indicative of a number of axles of the vehicle 1, the method comprising:

- by a processing circuitry 902 of a computer system 900, obtaining 202, 802 vehicle condition data indicative of at least one load applied to the vehicle 1,
- by the processing circuitry 902, obtaining 203, 803 the axle configuration of the vehicle 1,
- by the processing circuitry 902, estimating 204, 804 a current weight W of the vehicle 1 based on the obtained vehicle condition data and based on the axle configuration of the vehicle 1,
- by the processing circuitry 902, obtaining 205, 805 a previously estimated weight of the vehicle 1,
- by the processing circuitry 902, based on a difference between the previously estimated weight and the current weight W of the vehicle 1, predicting 206, 806 whether there has been a change in the axle configuration of the vehicle 1.

Example 14. The method of Example 13, wherein predicting 206, 806 that there has been a change in the axle configuration of the vehicle 1, further comprises predicting an updated axle configuration of the vehicle 1.

Example 15. The method of any of Examples 13-14, further comprising detecting 201 the fulfillment of a triggering condition, and wherein estimating 204, 804 the current weight W of the vehicle 1 and/or to obtaining 202, 802 the vehicle condition data, is performed in response to the fulfilment of the triggering condition, and wherein the triggering condition comprises any one or more out of:

- the vehicle 1 is detached from a trailer,
- the vehicle 1 has travelled at least a first predefined distance since estimation of the previously estimated weight,
- a time period since estimating the previously estimated weight exceeds a threshold.

Example 16. The method of any one of Examples 14-15, further comprising, adapting 207 one or more parameters used for controlling the vehicle 1 based on the updated axle configuration.

Example 17. The method of any of Examples 14-16, wherein the updated axle configuration is indicative of any one or more out of:

- a number of axles added to, or removed from, the axle configuration,
- a type of one or more axles added to, or removed from, the axle configuration,
- a position of one or more axles added to, or removed from, the axle configuration.

Example 18. The method of any of Examples 14-17, wherein predicting the updated axle configuration comprises predicting the updated axle configuration based on a trained statistical model, or based on a predefined heuristic model.

Example 19. A computer program product comprising program code for performing, when executed by the processing circuitry 902, the method of any of Examples 13-18.

Example 20. A non-transitory computer-readable storage medium comprising instructions, which when executed by the processing circuitry 902, cause the processing circuitry 902 to perform the method of any of Examples 13-18.

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to handle an axle configuration of a vehicle, the axle configuration being at least indicative of a number of axles of the vehicle, the processing circuitry further being configured to:

obtain vehicle condition data indicative of at least one load applied to the vehicle, obtain the axle configuration of the vehicle, estimate a current weight of the vehicle based on the obtained vehicle condition data and based on the axle configuration of the vehicle, obtain a previously estimated weight of the vehicle, based on a difference between the previously estimated weight and the current weight of the vehicle, predict whether there has been a change in the axle configuration of the vehicle, and in response to predicting that there has been a change in the axle configuration of the vehicle, adapt at least one of the following: one or more configurations, one or more control parameters, and/or one or more control models of the vehicle based on the updated axle configuration of the vehicle.

2. The computer system of claim 1, wherein when predicting that there has been a change in the axle configuration of the vehicle, the processing circuitry is further configured to, based on the difference between the previously estimated weight and the current weight of the vehicle, predict an updated axle configuration of the vehicle.

3. The computer system of claim 1, wherein the processing circuitry is further configured to detect the fulfillment of a triggering condition, and wherein the processing circuitry is configured to estimate the current weight of the vehicle and/or to obtain the vehicle condition data in response to the fulfilment of the triggering condition, wherein the triggering condition comprises any one or more out of:

the vehicle is detached from a trailer, the vehicle has travelled at least a first predefined distance since estimation of the previously estimated weight, a time period since estimating the previously estimated weight exceeds a threshold.

4. The computer system of claim 2, wherein the updated axle configuration is indicative of any one or more out of:

a number of axles added to, or removed from, the axle configuration, a type of one or more axles added to, or removed from, the axle configuration, a position of one or more axles added to, or removed from, the axle configuration.

5. The computer system of claim 2, wherein the processing circuitry is further configured to predict the updated axle configuration based on a trained statistical model, or based on a predefined heuristic model.

6. The computer system of claim 5, wherein the trained statistical model is trained based on training data of one or more training vehicles travelling with a modified training axle configuration, and wherein the training data comprises any one or more out of:

an initial axle configuration of the respective one or more training vehicles, a modification performed to the modified training axle configuration of the respective one or more training vehicles, a weight of the respective one or more training vehicles, a position of the one or more training vehicles, one or more vehicle motion parameters of the respective one or more training vehicles.

7. The computer system of claim 1, wherein the processing circuitry is configured to predict that there has been a change in a number of axles in the axle configuration when the current estimated weight differs from the previously estimated weight by more than a threshold.

8. The computer system of claim 7, wherein the processing circuitry is configured to predict that there has been a change in the number of axles in the axle configuration by being configured to predict a quantity of axles that have been added or removed from the axle configuration based on the difference between the previously estimated weight and the current weight of the vehicle.

9. The computer system of claim 8, wherein the vehicle condition data is indicative of a current respective load applied to at least one axle with a respective predefined position of the vehicle, and wherein the processing circuitry is further configured to obtain a respective previously applied load to the at least one axle, and wherein the processing circuitry is further configured to predict a type and/or position of an added or removed axle based on a difference between the current respective load applied to the at least one axle and the previously applied load to the at least one axle.

10. A vehicle comprising the computer system of claim 1.

11. The vehicle according to claim 10, wherein the vehicle is modified with an added axle.

12. A computer-implemented method for handling an axle configuration of a vehicle, the axle configuration being at least indicative of a number of axles of the vehicle, the method comprising:

by a processing circuitry of a computer system, obtaining vehicle condition data indicative of at least one load applied to the vehicle, by the processing circuitry, obtaining the axle configuration of the vehicle, by the processing circuitry, estimating a current weight of the vehicle based on the obtained vehicle condition data and based on the axle configuration of the vehicle, by the processing circuitry, obtaining a previously estimated weight of the vehicle, by the processing circuitry, based on a difference between the previously estimated weight and the current weight of the vehicle, predicting whether there has been a change in the axle configuration of the vehicle, and in response to predicting that there has been a change in the axle configuration of the vehicle, adapting at least one of the following: one or more configurations, one or more control parameters, and/or one or more control models of the vehicle based on the updated axle configuration of the vehicle.

13. A computer program product comprising program code for performing, when executed by the processing circuitry, the method of claim 12.

14. A non-transitory computer-readable storage medium comprising instructions, which when executed by the processing circuitry, cause the processing circuitry to perform the method of claim 12.

* * * * *